United States Patent
Frank

(10) Patent No.: US 8,807,165 B2
(45) Date of Patent: Aug. 19, 2014

(54) CONTROL VALVE, IN PARTICULAR ANGLE CONTROL VALVE AND DOUBLE CONTROL VALVE, ALSO IN THE FORM OF A STRAIGHT-SEAT VALVE AND INCLINED-SEAT VALVE FOR EXTREME CONTROL APPLICATIONS

(75) Inventor: Martin Frank, Hofheim (DE)

(73) Assignee: Schuf Armaturen und Apparatebau GmbH, Eppstein (DE)

( * ) Notice: Subject to any disclaimer, the term of this patent is extended or adjusted under 35 U.S.C. 154(b) by 347 days.

(21) Appl. No.: 13/394,155

(22) PCT Filed: Jun. 6, 2011

(86) PCT No.: PCT/EP2011/059316
§ 371 (c)(1),
(2), (4) Date: Mar. 5, 2012

(87) PCT Pub. No.: WO2012/022511
PCT Pub. Date: Feb. 23, 2012

(65) Prior Publication Data
US 2012/0161054 A1    Jun. 28, 2012

(30) Foreign Application Priority Data

Aug. 20, 2010  (DE) .................... 20 2010 008 318 U
Feb. 10, 2011  (DE) .................... 20 2011 000 299 U

(51) Int. Cl.
F16K 25/00    (2006.01)
F16K 25/04    (2006.01)
F16K 11/10    (2006.01)
F16K 11/20    (2006.01)

(52) U.S. Cl.
CPC .............. *F16K 25/04* (2013.01); *F16K 25/005* (2013.01)

USPC ................ 137/599.01; 137/599.05; 251/120; 251/122; 251/368

(58) Field of Classification Search
USPC .............. 137/599.01, 601.18, 601.19, 512.1, 137/512.3, 375, 599.05; 251/120, 121, 122, 251/368
See application file for complete search history.

(56) References Cited

U.S. PATENT DOCUMENTS

| | | | | |
|---|---|---|---|---|
| 903,206 | A | * | 11/1908 | Lauson ........................... 261/53 |
| 2,642,254 | A | * | 6/1953 | Armstrong ................. 137/637.2 |
| 2,792,845 | A | * | 5/1957 | Atherton et al. .............. 137/375 |
| 2,926,885 | A | * | 3/1960 | Szulc et al. .................... 251/214 |
| 3,110,320 | A | * | 11/1963 | Rosenberger ................. 137/563 |
| 3,170,483 | A | * | 2/1965 | Milroy ........................... 137/553 |
| 3,857,542 | A | * | 12/1974 | Heymann ...................... 251/120 |
| 3,879,984 | A | * | 4/1975 | Welland ....................... 73/23.24 |

(Continued)

*Primary Examiner* — Stephen M Hepperle
*Assistant Examiner* — Seth W Mackay-Smith
(74) *Attorney, Agent, or Firm* — Michael Soderman

(57) ABSTRACT

The invention relates to a control valve, in particular an angle control valve and double control valve, for extreme control applications, preferably for discharge or reduction for hot separators and vacuum distillation columns. The valve piston and the valve head are designed as one piece and consist of tungsten carbide. Furthermore, the control valve comprises different constructions across the entire control valve range. For example, the valve housing, the valve seat and a packing retainer are optionally shaped such that the inner hollow space tapers continuously from the valve inlet to the valve seat, which prevents evaporation upstream of the valve seat. Furthermore, the double control valve consists of a large sub-valve and at least one small sub-valve, wherein the large sub-valve is designed as an adjustable open-closed piston valve and the small sub-valve is designed as a control valve.

20 Claims, 12 Drawing Sheets

(56) References Cited

U.S. PATENT DOCUMENTS

| | | | |
|---|---|---|---|
| 4,161,187 A * | 7/1979 | Bauer | 137/375 |
| 4,337,788 A * | 7/1982 | Seger | 137/315.02 |
| 4,374,785 A * | 2/1983 | Wyatt | 261/51 |
| 4,383,553 A * | 5/1983 | Platt | 138/46 |
| 4,413,646 A * | 11/1983 | Platt et al. | 137/240 |
| 4,638,833 A * | 1/1987 | Wolcott, II | 137/312 |
| 4,643,224 A * | 2/1987 | Rung et al. | 137/559 |
| 7,363,941 B2 * | 4/2008 | Caprera | 137/614.11 |
| 2006/0124881 A1 * | 6/2006 | Mentesh | 251/121 |
| 2006/0175564 A1 * | 8/2006 | Wears et al. | 251/120 |
| 2008/0060704 A1 | 3/2008 | McCarty | |
| 2008/0277616 A1 | 11/2008 | Sullivan | |

\* cited by examiner

CONTROL VALVE, IN PARTICULAR ANGLE CONTROL VALVE AND DOUBLE CONTROL VALVE, ALSO IN THE FORM OF A STRAIGHT-SEAT VALVE AND INCLINED-SEAT VALVE FOR EXTREME CONTROL APPLICATIONS

CROSS REFERENCE TO RELATED APPLICATIONS

This application is the U.S. national stage of International Application No. PCT/EP2011/059316, filed on Jun. 6, 2011, and claims the benefit thereof. The international application claims the benefits of German Application No. 202010008318.4 filed on Aug. 20, 2010, and of German Application No. 202011000299.3 filed on Feb. 10, 2011; all applications are incorporated by reference herein in their entirety.

BACKGROUND

The invention relates to a control valve, in particular an angle control valve and double control valve, also as a seat valve and angle seat valve, for extreme control applications with erosive and corrosive media at temperatures of over 500° C. and pressure drops of over 100 bar, preferably for draining or down-regulating for high-pressure hot separators, medium-pressure hot separators and vacuum distillation columns, in particular for hydrogenation, and particularly for coal liquefaction, essentially with an inlet funnel, an outlet funnel lined with tungsten-carbide, with valve seats arranged between them, and a valve piston provided with a control valve head, whereby the valve seat and the valve heads consist of solid tungsten carbide.

In typical hydrogenation or 'upgrading' plants, heavy hydrocarbons are enriched with hydrogen, in order to produce light hydrocarbons, which are suitable for transport machinery, in particular for aeroplanes and motor vehicles. The reaction between hydrogen and hydrocarbon takes place under high pressure and at high temperatures, and results in a mixture, whose components can then be separated into different levels, namely in high-pressure hot separators, medium-pressure hot separators, as well as in atmospheric and vacuum distillation columns.

For this purpose, control valves are used in critical media with extreme conditions, e.g. in order to drain in high-pressure hot separators, i.e. to down-regulate. In this process, the pressure between the levels is removed, and the flow of the medium is controlled.

Evaporation inevitably takes place in the control valve, partly supercritical, since the pressure falls under the vapour pressure in each valve. This causes cavitation, erosion and vibration in the valves, and possibly in the pipelines, which is exacerbated by the presence of solids, such as, for example, catalyst residues. The most critical application is in coal liquefaction, in which coal provides the heavy hydrocarbons. The ash does not react with the hydrogen and dramatically increases the solids content. It is also very erosive.

The medium flows with high pressure and is reduced from approximately 200 bar to approximately 40 bar. In this process, the medium evaporates and destroys parts of the valve seat, the valve head and the valve stem or valve piston. Since the medium generally contains solids, the solids are flung against the internal walls of the valve, and cause abrasion. In addition, the vibrations in the pipeline are very high, and therefore there is a high degree of destruction of the valve parts. This also happens since the usually conical valve head of the valve piston hits against the valve seat.

The valve housing parts of the control valve normally consist of steel or stainless steel. In the majority of cases, the temperature of the medium is very high, for example, 500° C. Additionally, the control valves comprise a valve seat and a valve head of solid tungsten carbide, and so do not only have a coating. The valve piston consists of stainless steel. However, a valve head made of a tungsten carbide cone cannot easily be welded to a valve piston made of steel. Thus, a two-part ring made of stainless steel connects both parts and is then welded, which is expensive. A disc spring, which is heat-resistant, i.e. high-temperature resistant, made of Inconel presses the valve piston against the valve head, when the steel parts expand due to the high temperature.

Steel expands considerably at this high temperature—however, tungsten carbide does not, since this material has a much smaller thermal expansion coefficient. When the control valve is opened, strong flow forces occur, in such a way that the valve piston is exposed to vibrations. At the same time, parts of the valve piston and the valve head shake in the valve seat. In order to reduce these vibration effects, damping rings made of graphite were used in the outlet funnel, which however did not have the desired effect, and dissolved after a while.

Amongst others, further problems occur due to the fact that the tungsten carbide interior parts used sit in the housing parts made of steel. Relatively large gaps form due to the different thermal expansion coefficients, which makes the tungsten carbide parts subject to vibrations. The medium then collects between the gaps which form. The parts stick when cooling. Therefore, it is very difficult to disassemble the control valve to replace the parts which are stuck together.

Furthermore, other tungsten carbide parts, such as the valve head, are tightly bonded with steel parts, such as the valve piston, which is very complicated for the reasons mentioned. Tungsten carbide is also very expensive and has long delivery times.

So-called distribution valves are also known, in which the medium is distributed in a housing. However, double control valves, i.e. two control valves in one housing are not known.

SUMMARY

The object of the invention, therefore, is to create a control valve of the type mentioned at the outset, which solves the problems stated, and which better protects the interior parts of the control valve from aggressive media, and which controls the flow of the medium in a more reliable way.

According to the invention, the object is achieved, in that
the valve piston and the valve head are made in one piece, and consist of tungsten carbide,
the valve head preferably has a shortened, approximately semicircular ball control contour, for example, or
the valve head has a cup shape with one or several slits, whereby the hollow interior part is directed downstream, centrally, in transition from the inlet funnel to the internal valve seat, if required, a wall around the valve piston protectively projects into the housing cavity, and the flow passage around the walls and the valve piston is formed by an approximately semicircular flow contour,
the valve housing, the valve seat and a package holder, if necessary, are designed so that the interior cavity continually narrows from the valve entrance to the valve seat, which avoids evaporation upstream of the valve seat, if necessary, one or several pressure reduction levels are formed in the valve seat and/or in the outlet funnel, the lining in the outlet funnel and/or the valve seats is braced against the funnel wall or the valve seat support by at least one innovative disc spring, and/or is protected from vibrations by means of a leather wrapping, at the end of the valve seat and/or in the outlet funnel if necessary, a bed of tungsten carbide balls is formed as an alternative pressure reduction level.

The aim is to reduce the contact of the erosive medium when hitting against the valve head and the valve seat as much as possible, and to avoid the formation of gaps between the steel parts and the interior parts made of tungsten carbide, in particular in the valve seat and outlet funnel areas of the control valve. Furthermore, evaporation of the medium before the valve seat is eliminated as far as possible, and a large amount is transferred downstream from the valve seat in different additional pressure reduction levels. Therefore there is less cavitation, erosion and vibration in the hub active cone and seat, and more in the additional pressure reduction levels, which are more resistant.

DETAILED DESCRIPTION

In the control valve according to the invention, the valve pistons (also denoted as 'valve stems') and the valve head are completely formed from one piece of solid tungsten carbide. Tungsten carbide is a very hard material and therefore particularly suitable for valve parts, which are subjected to high temperatures and pressures. Through this, the complicated and expensive connection, and, if necessary, dismantling of the valve piston and the valve head is avoided. However, tungsten carbide lacks the necessary elasticity, and therefore the valve piston must be protected from side loads.

The shortened, approximately semicircular ball contour of the valve head guarantees an optimal balance between control power and lifetime with this shorter control contour. In this process, a slightly worse control contour or control characteristics are indeed given; however, the vibrations of the valve head against the valve seat are reduced. At the same time, it is also possible to avoid the tungsten carbide valve head being subjected to excessive vibrations. The shorter, thicker valve head causes fewer exposures (shaking) and the valve piston can be attached outside of the actuating area of the piston, namely in a previously arranged hollow connection part, which is also referred to as a 'lantern'.

The parabolic valve head has a full linear control contour, for good control, but is reduced in length, so that the valve head is not subjected too much to the laterally acting force due to the lateral flow impact of the medium.

Alternatively, a cup-shaped valve head made of solid tungsten carbide is guided into the valve seat. Contrary to the typical cone, there is no parabolic control contour of the valve head. Instead, it has the form of a cup, whereby the hollow interior part is directed downstream. The medium flows through one or several slits downstream through the valve seat or into the outlet funnel. This permits a variable limit of the opening characteristics of the control valve, if the cup-shaped valve head is opened with the valve piston. The cup shape of the valve head thus represents a V-shaped expansion, which allows it to act as an expanded valve seat.

Further embodiments and advantages of the control valve according to the invention are given in the sub-claims.

Accordingly, the slits are distributed in the exterior wall of the cup-shaped valve head in the direction of movement of the valve piston, and arranged in such a way that the media flows through the two or several slits, so from several sides, collides and swirls. Energy is used in this process, and the degree of destruction is considerably reduced. The connection of valve piston and surrounding steel parts takes place outside of the medium flow.

Furthermore, the hollow interior part of the cup-shaped valve head is designed conically with the same angle as the expansion of the valve seat.

As a rule, there exists a relatively long straight way for the valve piston, which is unprotected against the medium and vibrations. In order to improve protection, the housing interior around the valve seat is changed. Viewed contrary to the direction of flow, a metal wall protrudes centrally in the flow passage, and largely protects the valve piston against the impact of the media flow. In this process, the media flow is ensured, in that the housing interior comprises a lateral, approximately semicircular flow contour.

According to a further design, several pressure reduction levels are arranged alternately widening and narrowing consecutively in the direction of flow of the medium in the valve sear and/or outlet funnel, so that the media pressure can be reduced.

Two or several fixed pressure reduction levels are preferably designed in or behind the valve seat, in order to displace the pressure reduction. This has the advantage that 50% or more of the pressure is released with more than 50% evaporation in this second pressure reduction level. The valve head is now only exposed to the released pressure and evaporation in the first pressure reduction level.

In this process, there is an intermediate pressure Pi between P1 (before the first level) and P2 (after the last level). The valve head of the valve piston must then no longer withstand the complete pressure reduction, so no longer P1-P2, rather only P1-Pi. Since evaporation mainly takes place at pressures of under Pi, it is also largely protected from cavitation.

A further design of the invention relates to a bed of tungsten carbide balls, similar to balls in rolling bearings. This creates a labyrinth as a second pressure reduction level, but with a good anti-erosion profile, since each ball has an ideal erosion resistance. Thus the medium can also comprise a range of small solid bodies, which can work through the labyrinth of balls, since the balls of the labyrinth are themselves able to move.

The bed of tungsten carbide balls is bordered by screening plates on the flow inlet and outlet side, whereby the holes of the screening plates preferably have a quadratic form, so that the balls can position themselves on the holes and the medium can still flow.

Furthermore, on the flow outlet side, at least two consecutively arranged screening plates are provided, whereby the first screening plate consists of solid tungsten carbide, in order to resist erosion. Since tungsten carbide does not possess much elasticity, the second screening plate made of steel supports the first screening plate made of tungsten carbide.

The holes of the second screening plate are arranged exactly behind the holes of the first screening plate. Alternatively, the holes of the first screening plate are slightly smaller than the holes of the second screening plate, whereby the holes of the second screening plate widen conically, in order to prevent destruction of the second screening plate made of steel.

Due to their optimised shape, the balls are a suitable means against erosions. The medium is slowed down and pressure is reduced by the ball bed. An intermediate pressure Pi again develops.

In an advantageous embodiment, a pressure reduction level, subordinate to the valve seat, has a rapid widening in the outlet funnel in the direction of flow of the medium, whereby the direct transition from the valve seat into the outlet funnel is preferably shell-like with a small radius. This rapid i.e. sudden expansion in the valve outlet is much more than 40° in cross-section of the outlet. The prior art is a gradual, i.e. progressive expansion with less than about 40°, with regard to the longitudinal wall in the outlet funnel for outlet opening of the valve seat, in order to obtain the laminar flow, and to avoid a displacement of the flow from the wall and associated heightened turbulences. A computerised simulation shows that turbulence in critical media and high pressure drops cannot be prevented, anyway, and a laminar flow is impossible to achieve. However, the rapid expansion of much more than 40° allows a very quick and severe reduction of the speed of flow of the medium, which would bring more advantages than the gradual expansion with less than approximately 40°.

The outlet funnel of the control valve must also be protected against erosion. A solid tungsten carbide funnel as a lining is used in the interior of the outlet funnel. Since the metallic outlet funnel expands more than the tungsten carbide linings, the linings begin to shake. In order to avoid this, a high-temperature resistant, slightly inclined radial spring is used, with conical rings, which is used at an angle, similar to a disc spring, in order to exert a spring-effect.

The disc spring or radial spring, whose ring circumference is about 300°, is introduced in the outlet funnel. This is compressed before use and relaxes after use, for example, in a groove around the outlet funnel. In this respect, the ring circumference must clearly be less than 360°, similar to a retaining ring. The disc spring should develop its spring force when the steel expands, and so that the sleeve-like covering of tungsten carbide holds firm against the expanding steel. Furthermore, the disc spring consists of Inconel, a nickel-based alloy which is corrosion and temperature resistant.

Furthermore, it is intended that the valve seat support and the package holder are formed tapering slightly conically in the direction of flow, which are pressed in against the valve housing, which also tapers slightly conically. Furthermore, it is intended that the internal and external valve seats are kept in an insert member made of steel.

The insert member is introduced in the direction of flow tapering slightly conically, and pressing in against the valve housing, which also tapers slightly conically.

Therefore the insert member can slide further into the internal housing, since it expands as a result of the high temperature. The formation of gaps is avoided at the same time.

Expediently, up to now, tungsten carbide has been used, containing 6% binding agent, namely cobalt or nickel. The particle size of tungsten carbide is fine. In order to obtain an optimal material for the valve piston, the particle size should be enlarged to medium, and at least 10% binding agent should be used, in order to increase the elasticity. Then, however, the binding agent should be protected before elutriation, by applying a special hardening coating.

Furthermore, the valve parts, particularly the interior parts, instead of tungsten carbide, consist of ceramic e.g. SiN or SiC, or a mixture of tungsten carbide and ceramic. In this process, the ceramic can be strengthened with graphite fibres.

Moreover, short package holders or similar damping devices are provided between the tungsten carbide or ceramic parts and the steel body and the valve seat support parts, in order to prevent vibration damage, which increase the distance between the tungsten carbide or ceramic parts and the steel body and the seat support, as a result of different thermal expansion during heating.

A long package holder exists in the prior art, since the valve piston is guided as far as possible by its length. However, the product-side high temperature package can only be tightened by means of screws i.e. it does not build up enough tension, so that leakages occur. For this reason, medium enters the connection part between the valve and the drive, which makes it difficult to access and exchange valve parts. A now shortened package holder is easier to use and better seals the valve seat.

The valve housing, the valve seat and the package holder are designed so that the interior cavity continually narrows from the valve inlet to the valve seat, which prevents evaporation upstream of the valve seat. The higher speed which results from this exerts a stronger lateral force on the valve piston, which, however, is compensated by changed design of the package holder, and the valve head and the valve piston are optimally guided and the flow is optimally diverted.

A combination of the package or seal holder, the valve head, the valve piston and the internal valve seat can be easily replaced whilst the control valve is installed in a plant. The connection part between the valve and the drive is open, and allows the parts to be moved and dismantled, so that the combination of the named parts can be replaced. For this, the connection part must be long and wide enough around the interior parts in order to get to them, and the connection members installed between the valve stem and the drive piston.

According to a further embodiment of the control valve, the interior parts, such as the internal and external valve seat, valve piston, valve head and package holder are removable without dismantling the connection parts or the lantern and the hydraulic drive. Furthermore, for the purposes of repairs and maintenance, the connection part or the lantern is lengthened and widened, so that these interior parts can be drawn into the lantern, and the connection piece can be detached, and the interior parts can be replaced. The hydraulic drive can be used in this process to draw these interior parts out of the valve housing.

The invention relates to an angle control valve. Use in seat valves and angle seat valves is also possible.

When the single control valve is fully closed, there is no stress. The completely open position is also acceptable, because then the pressure drop and flow speed of the medium are the lowest. In a control position, in which the valve is 20% open, for example, this then wears out mostly because the pressure drop and flow speed are very high. The valve piston is also least moved in the middle position and therefore is the most subject to vibrations. In the best case, the valve is sometimes operated when it is completely open and sometimes completely closed. So if a control valve were 50% open, it could also be kept fully open 50% of the operating time and kept fully closed for 50%. Thus, for 50% of the operating time there would be no flow at all, and for 50% of the operating time there would be double the flow, which, however, gives the optimal flow on average. But this would be catastrophic for the controlling mechanism, since in the time where the valve is completely closed, the pressure of the medium builds up in the container in front, and the pressure drops on the output side. This would lead to unacceptable fluctuations in the filling levels and pressures. Thus this does not give a uniform and optimal operation of the plant, which is just what is to be achieved. A control valve can also not be replaced by an on-off valve.

The invention therefore also relates to a double valve, which replaces a single valve.

When a double control valve is used, this consists of a large valve part and a small valve part, whereby the large valve part is formed as an adjustable 'on-off' piston valve, and the small valve part is designed as a control valve. The desired medium flow is therefore produced, and pressure fluctuations are also balanced out.

With regard to the medium flow, the large valve part is arranged so that it can meet the basic needs. Normally, the large valve part is always open so far as to guarantee a flow from the inlet funnel via the valve piston. The valve piston diameter and valve seat diameter are sized so that the basic amount can flow through the seat. The flow can be slightly reduced, in that the valve piston is gradually closed, until approximately 90% capacity of the medium flow is taken in. In this process, the large valve part should never be nearly completely closed, since the small valve part cannot take in the required rate of flow.

Whilst a single valve takes 100% of the medium flow, the large valve part of the double control valve takes at least 80% and the small valve part takes up to about 20% of the medium flow.

The small valve part, which is formed as a control valve, allows for fine control. Therefore the double control valve consists of a mixture of 'always on' piston valve operation and controlled operation. If the large valve part is operated in the 'on' position, fluctuating up to 90%, the small valve part controls the rest of the amount. Since the small valve part provides about 20% of the total capacity, 90%+/−20% can be controlled without adjustment of the large valve part.

Therefore, the operator has an optimal effect. The large valve part is not damaged at all, since it is about 90% open, whilst the small valve bears the main burden of wear and tear.

The large valve part is optimised for little wear and tear, but for this reason, it cannot control well, i.e. so it is unsuitable as a control valve. Thus the small valve part is provided for controlling the flow speed and amount. It can wear out quicker in this process; however, the worn out parts of the small valve part are easier and cheaper to replace. Both valve parts are thus designed so that they can be separately maintained, and normally only the worn out parts in the small valve part must be replaced.

A first large single valve and, separately, another small, cheaper single valve could be used in the pipeline. However, both valves are not considerably cheaper than one valve, and a change of pipeline must also be effected.

As soon as the pressure loss drops below the evaporation pressure of the medium, the medium evaporates and the speed of flow rises considerably. If, in the process, solids are carried along in the flow medium, these are also accelerated and crash against the metallic walls of the pipeline and destroy it. If the product of two valves is led at right angles, this happens particularly at the T-piece.

In order to prevent the destruction of the pipeline walls and subsequently also the double control valve, according to a further development of the double control valve, the longitudinal axis of the valve part is inclined to the longitudinal axis of the large valve part at an angle of preferably about 20°. In this way, the longitudinal axes of both valve parts run together, so that no excessive wear develops. Therefore the outflows of the medium are diverted to the outlet funnel of the double control valve without high impact energy. If a larger angle is used between the axes of the valve parts, the outflows, since they usually contains solids, crash against the valve walls and pipeline walls with higher energy, which damages these or even destroys them.

Furthermore it can be intended, that the small valve part is designed as a pulsing and/or 'on/off' control valve. For the reasons already mentioned, the whole valve cannot be operated in the 'on/off' operation to reduce damage. However, since the large valve part constantly lets 90% through, the small valve part can usually be operated in the 'on/off' operation, which minimises damage, and therefore is subjected to minimal wear and tear. In this way, the process is only subject to very small fluctuations in pressure and flow speed. Instead of varying between 0 and 200% in flow, the flow only varies between 90% and 110%. This can be further reduced by simple adjustment of the piston of the large valve part. Then the 'on/off' operation can be further modified, in that it can be changed to a pulsing control valve. In the pulsed operation, it is not operated as a simple 'on/off' operation, but rather as a mixture between 'on/off' and controlling, whereby the high-wear positions under the 30% range are avoided, and are replaced by fully closed (range=0%) positions and pulses of longer, e.g. 70%, 'on' positions.

A further advantage of separating the valves is that the hydraulic speed drive, which is complicated, expensive and difficult to use, can be omitted for the large valve part. A simple, reliable, slow-operated standard hydraulic drive can be used for the large valve part. In the majority of cases, a hydraulic drive is no longer needed for the smaller valve part; a pneumatic drive would suffice. A hydraulic speed drive is much more difficult and more expensive to operate.

Furthermore, the inlet funnel is split into two parts, in a way that there is no cross-sectional enlargement in front of the valve seats. Cavitation and evaporation of the medium are therefore avoided. Additionally, due to the separation of the inlet, the smaller valve part can be equipped with a pneumatic drive which is easy to control.

The evaporation, which inevitably happens downstream, and which leads to stresses of the valve seat and funnel, causes its damage in each particular outlet, mostly only on the respective valve part outlet, and not on the other valve part. In this way the destruction by cavitation and wear and tear, above all, are largely avoided in the large valve part, whilst the remainder mainly takes place in the small valve part.

According to a further embodiment of the double control valve, the large valve part is designed so that this takes at least 80% of the maximal flow without regulation; however, it is adjustable by about 20%. In addition, the small valve part is designed so that this takes up to about 20% of the maximal flow with regulation.

It is understood that the above-mentioned features and those which will be subsequently explained, can be used not only in the given combinations, but also in other combinations or singularly, without leaving the framework of the present invention.

The concept behind the invention is described in more detail in the following description by means of typical examples, which are presented in the drawings.

DETAILED DESCRIPTION OF THE PREFERRED EMBODIMENT

Figure 1:
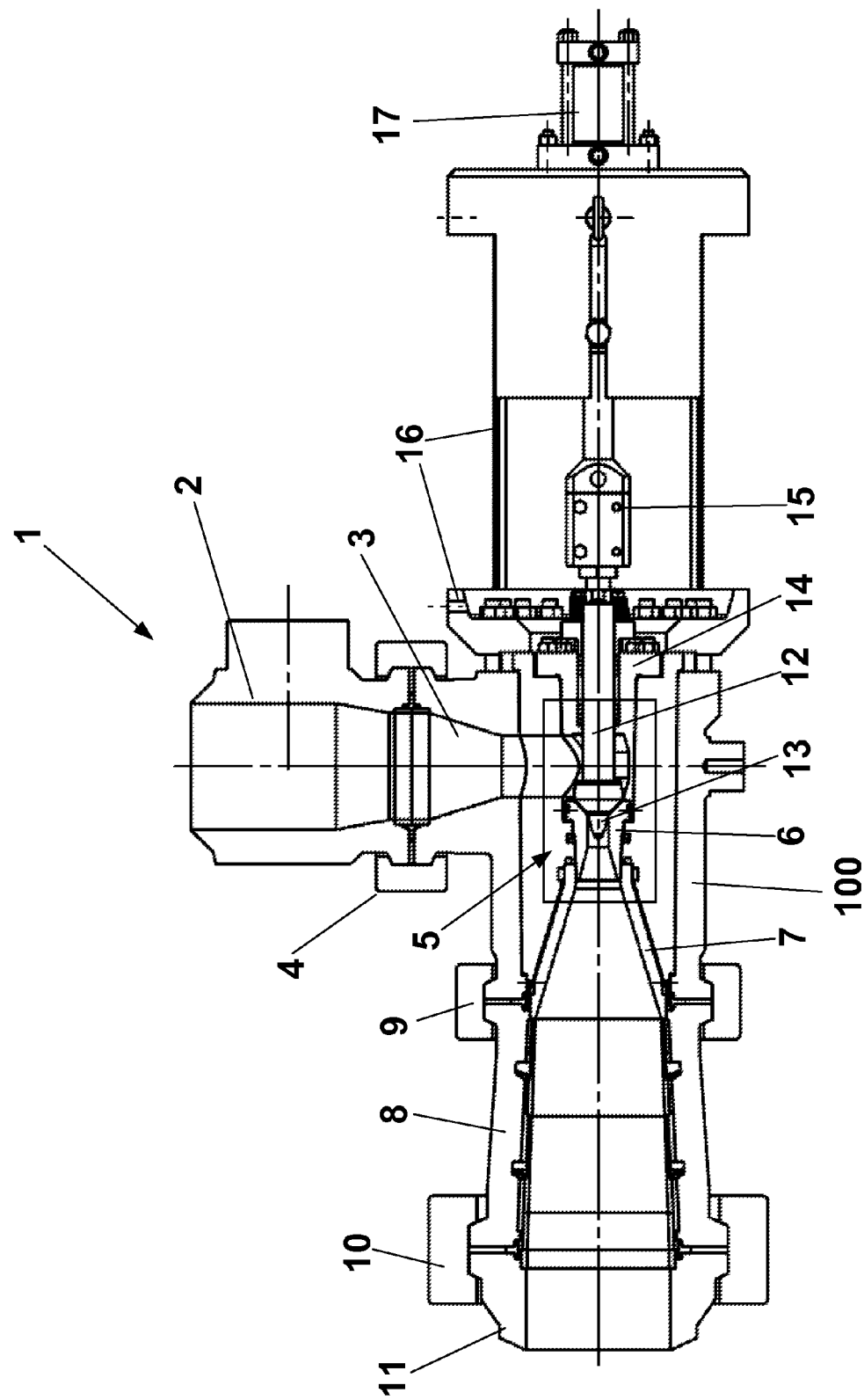
FIG. 1 shows a side view of a complete angle control valve as a single valve in a first embodiment.
Figure 2:
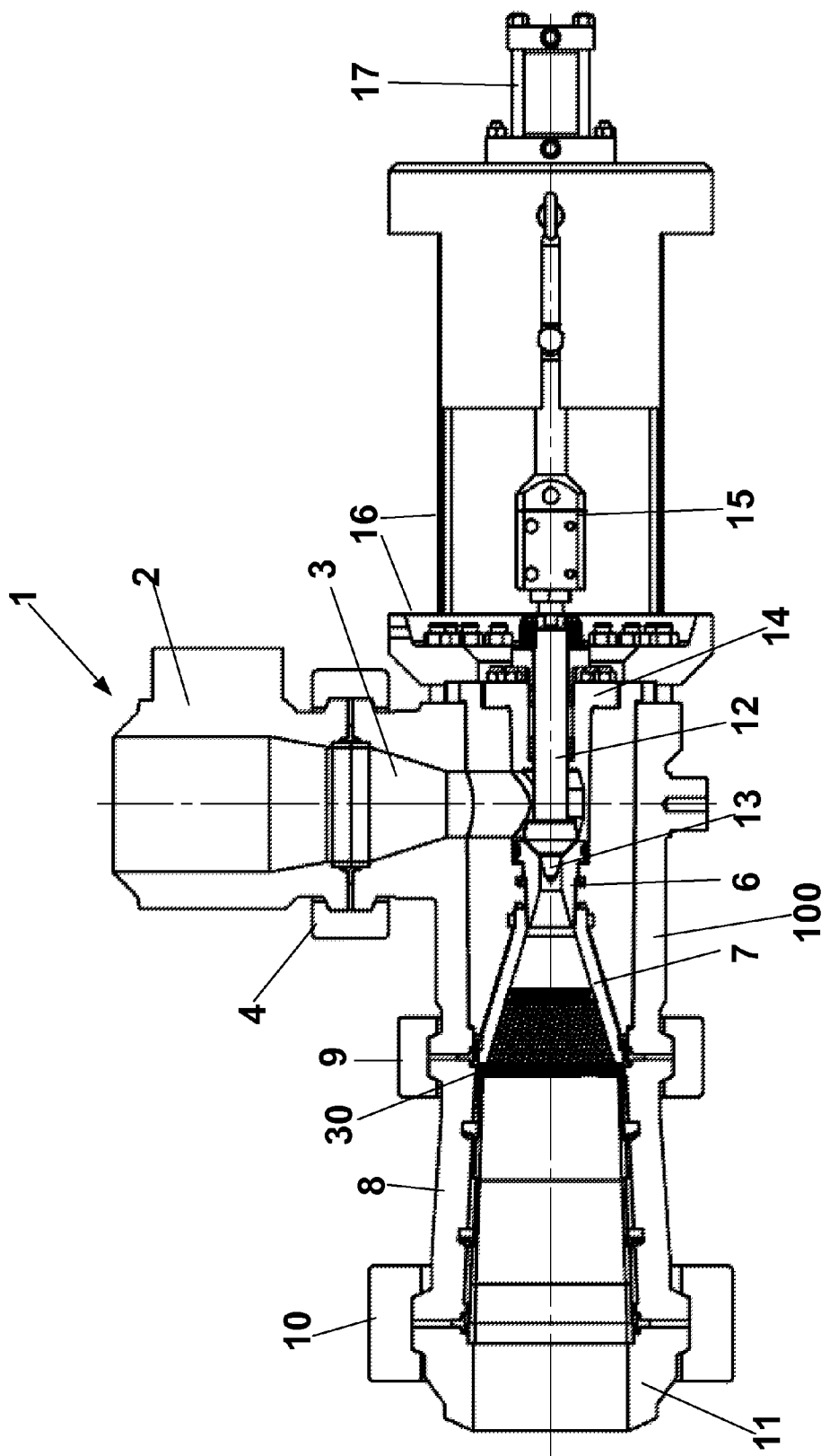
FIG. 2 shows a side view of a complete angle control valve as a single valve in a second embodiment.

The control valve 1 with a valve housing 100 according to FIGS. 1 and 2 is formed as a single valve, and consists in its main parts of a media supply 2 for transport of an erosive and corrosive medium inside of a plant, not shown in detail, for example, a separator. In the valve housing 100, the media supply 2 joins an inlet funnel 3, which is connected to the media supply 2 by a clamping or flange connection 4. A valve seat is subordinate to the inlet funnel 3, the valve seat consisting of a valve seat support 5, internal valve seat 6 and an external valve seat 7, with the latter being subordinate to the internal valve seat 6. The external valve seat 7 is joined to an outlet funnel 8, which is connected to the housing 100 and therefore to the external valve seat 7 by means of a clamp 9. A connecting flange 11 for a pipeline which is not shown, connected by means of a further clamp 10, follows the outlet funnel 8.

A valve piston 12, on which a valve head 13 is formed at the end directed towards the valve seat 6, is arranged in the internal valve seat 6. The valve piston 12 is guided in a package holder unit or socket 14, which is connected to a connecting piece or stem 15, arranged against the direction of flow of the medium, which extends into a connection part 16. This connection part is also referred to as a 'lantern' due to its construction. The connection part 16, in turn, is connected to a hydraulic drive 17 for actuating the control valve 1.

Figure 3:
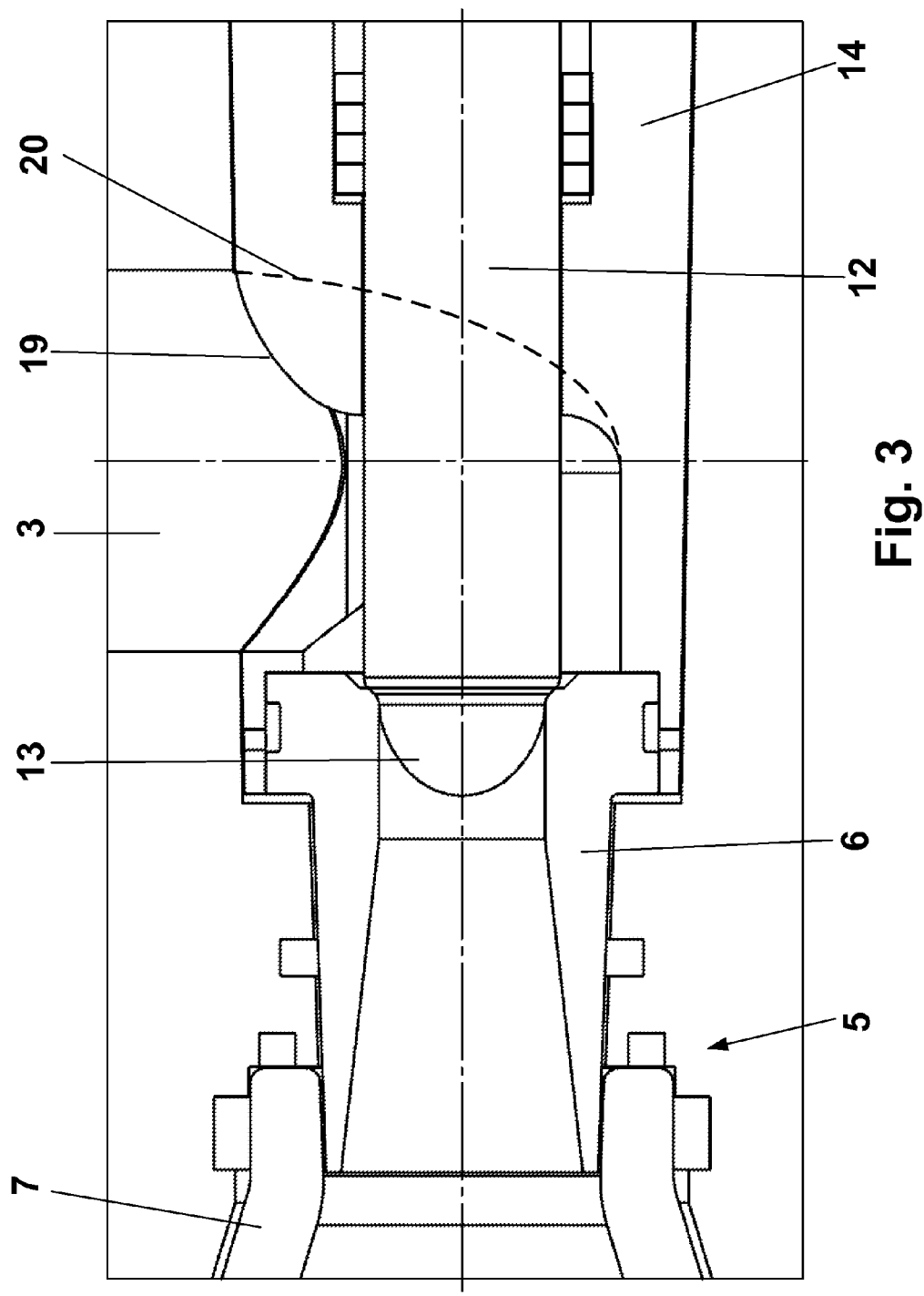
FIG. 3 shows an enlarged section as a side view of the valve seat area of the angle control valve as a single valve in a first embodiment.

The internal valve seat 6 consists of a shortened insert member made of tungsten carbide, which is formed to taper slightly conically in the direction of flow, and is pressed against the valve seat support 5, which also tapers slightly conically, as shown particularly in FIG. 3.

The external parts of the control valve 1, so excluding the valve seat 6 and 7 with the valve piston 12 and the valve head 13, essentially consists of steel or stainless steel.

In the first embodiment of the valve seat area 6 of the control valve 1, according to FIG. 3, the valve piston 12 and the valve head 13 are integrally formed and consist of solid tungsten carbide. The valve head 13 has a shortened, approximately semicircular ball contour, which, on closing of the control valve 1, partly enters the internal valve seat 6, which is formed as a slightly tapering insert member.

Centred in the transition from the inlet funnel 3 to the valve seat 5, a wall 19 around the valve piston 12 projects into the internal valve seat 6. The flow passage in this area is formed by an approximately semicircular flow contour 20, which is shown by the dotted line, since it cannot be seen in the side view.

Figure 4:
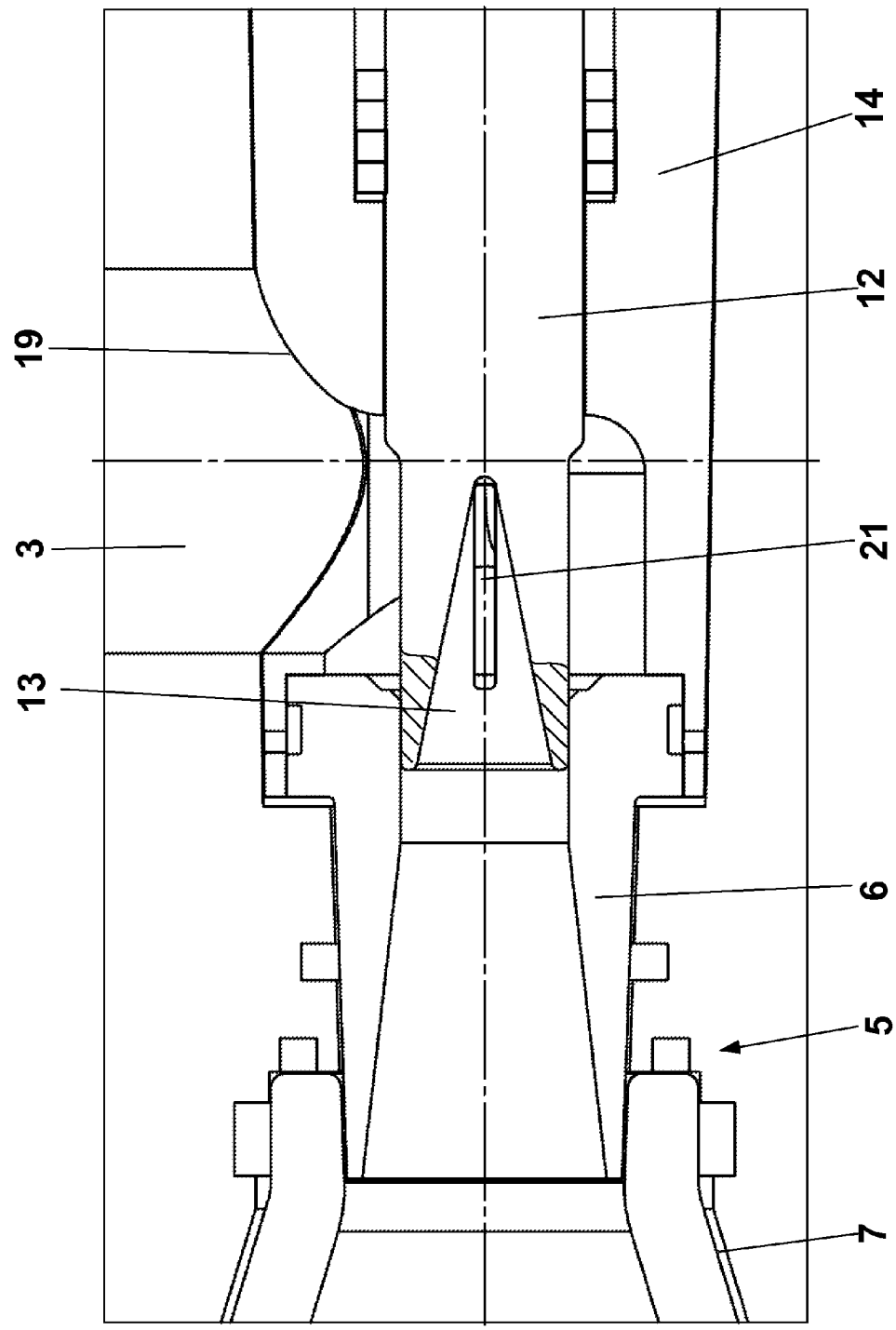
FIG. 4 shows an enlarged section as a side view of the valve seat area of the angle control valve as a single valve in a second embodiment.

According to the second embodiment of the valve seat area 6 of the control valve 1 according to FIG. 4, the valve head 13 has a cup form with several slits 21, whereby the hollow interior of the valve head 13 is directed downstream. The slits lie diametrically opposite each other, so that only one of the slits 21 can be seen in FIG. 4. The slits 21 are distributed in the external wall of the cup shaped valve head 13 in the direction of movement of the valve piston 12.

Figure 5:
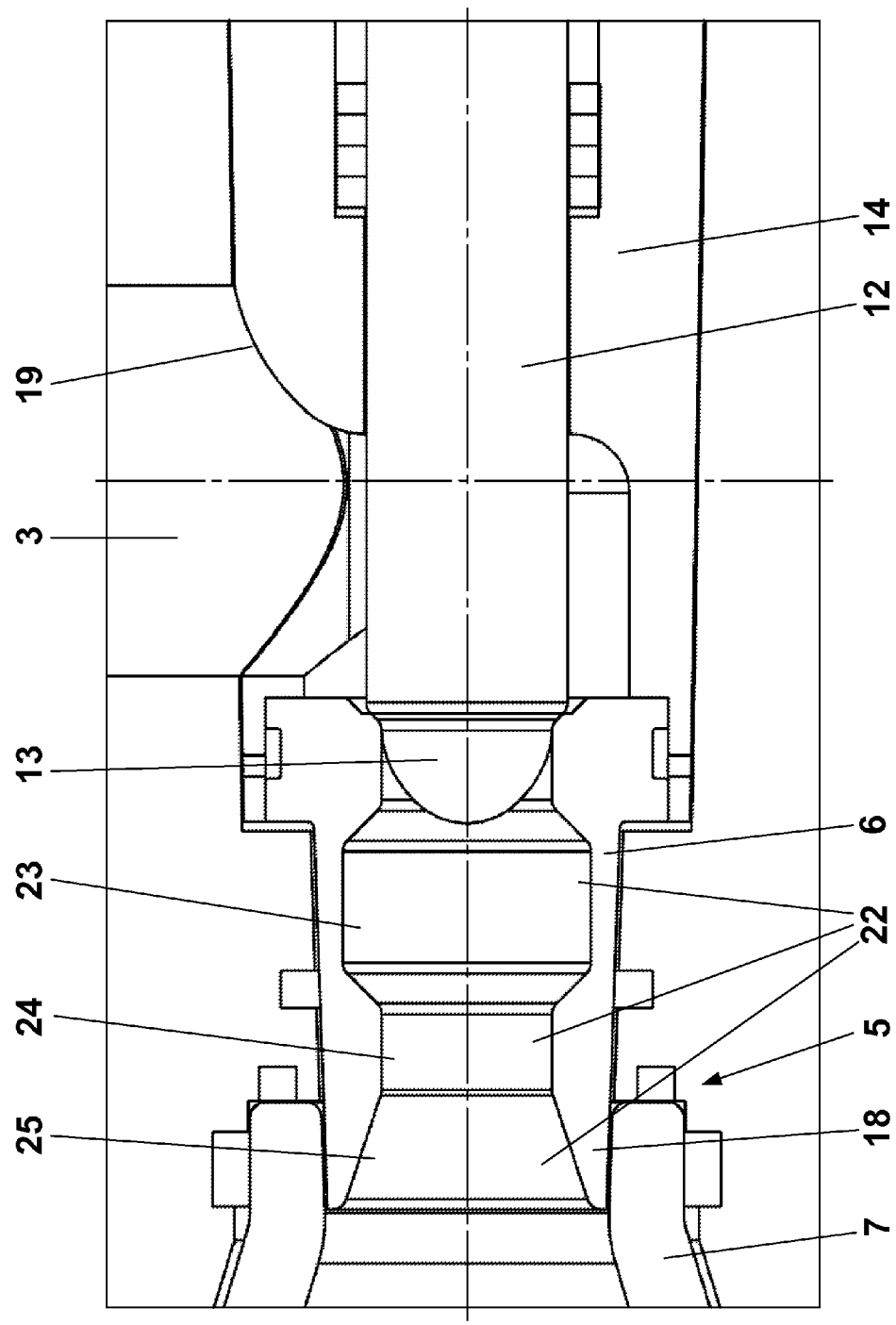
FIG. 5 shows an enlarged section as a side view of the valve seat area of the angle control valve as a single valve in a third embodiment.

In the third embodiment of the valve seat area 6 of the control valve 1 according to FIG. 5, several pressure reduction levels 22 are formed in the insert member 18 of the internal valve seat 6, namely in the direction of flow of the medium, an expansion 23, a constriction 24, and another expansion 25, in which the pressure of the medium flowing through the control valve 1 is reduced in the open position.

Figure 6:
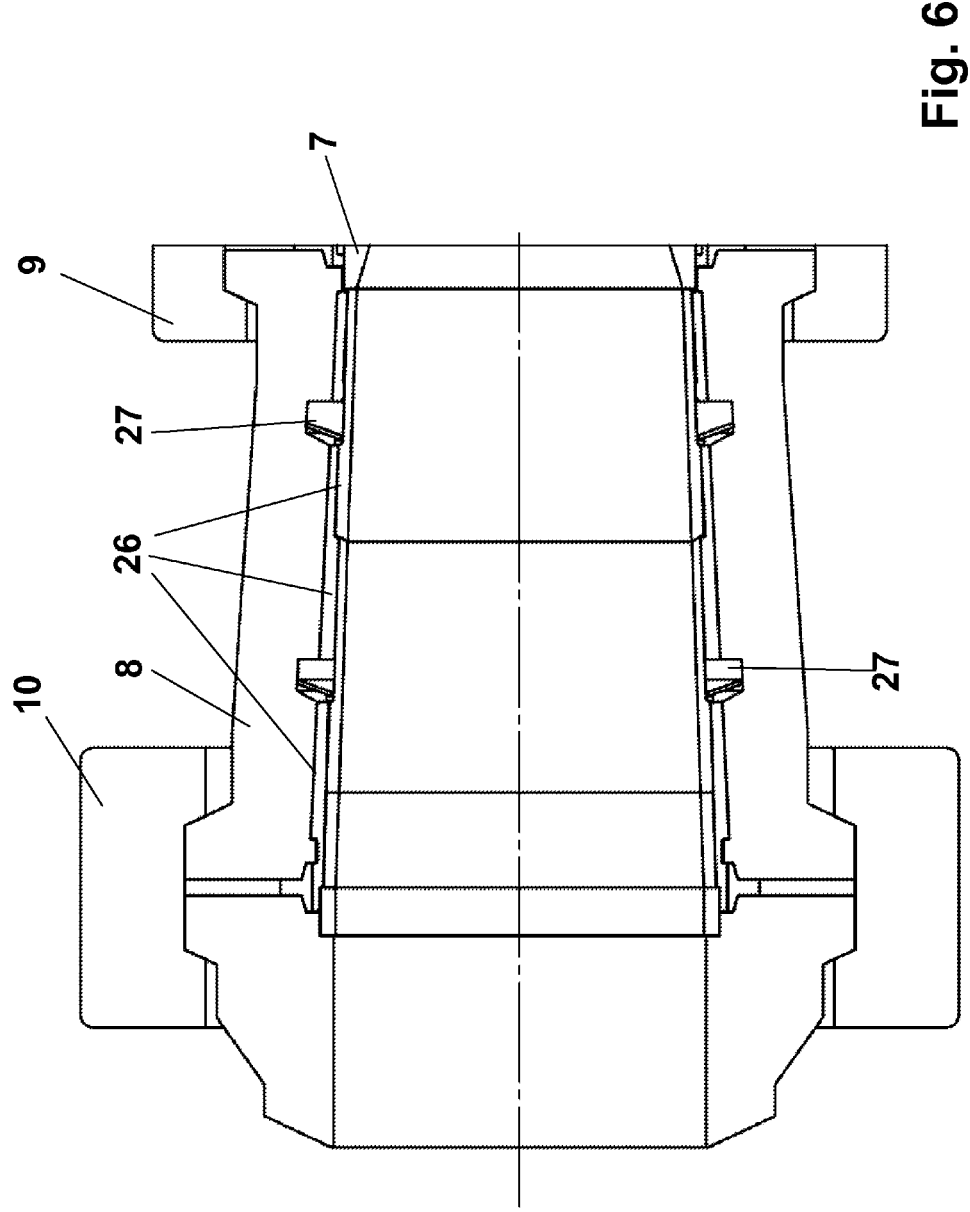
FIG. 6 shows an enlarged section as a side view of the outlet funnel of the angle control valve as a single valve.

FIG. 6 shows an outlet funnel 8 extending in the direction of flow of the medium, with a tungsten carbide lining 26, which is braced against the funnel wall by two separate slightly inclined radial springs 27 made of Inconel.

Figure 7:
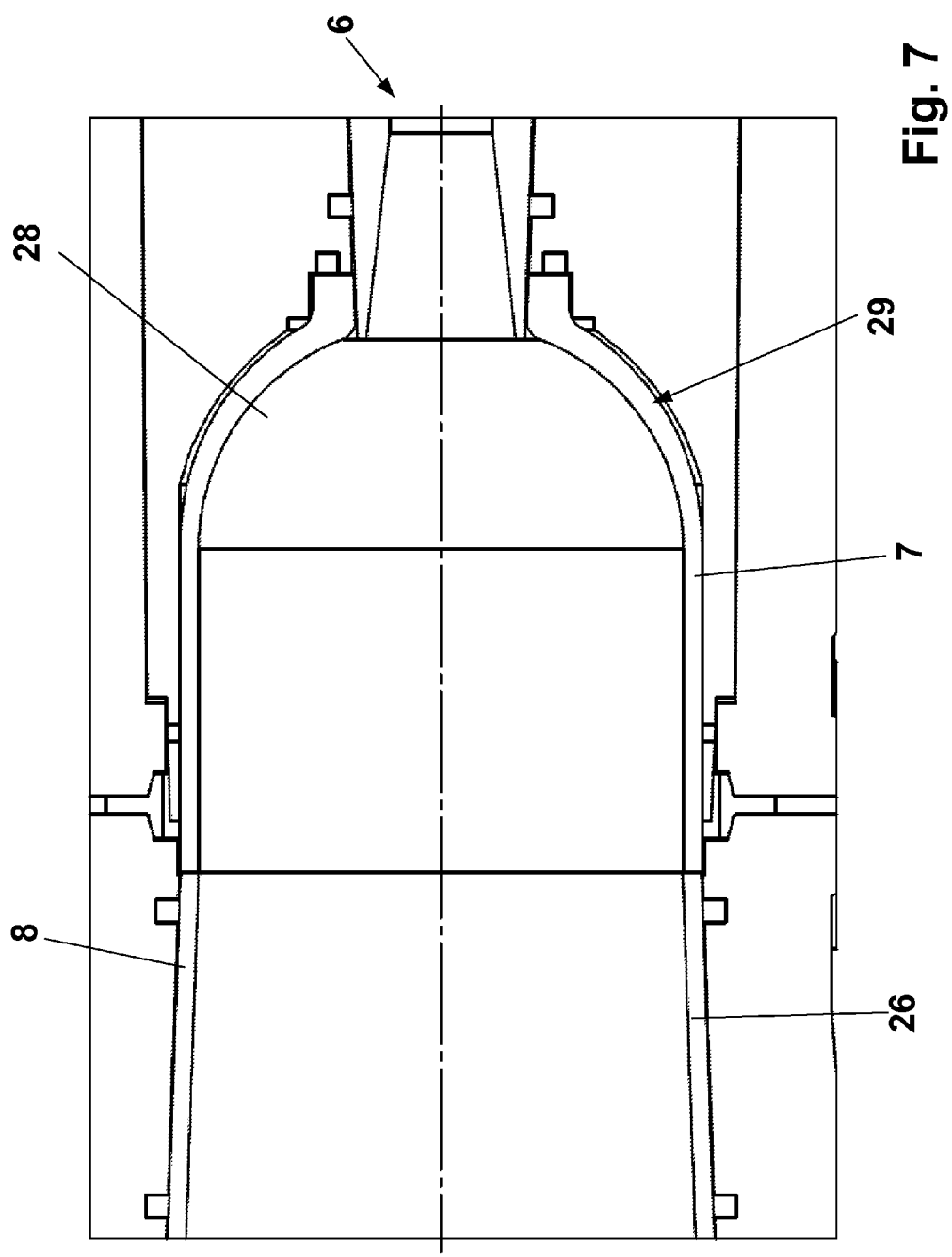
FIG. 7 shows an enlarged section as a side view of the external valve seat area of the angle control valve as a single valve in a first embodiment.

In FIG. 7, an external valve seat 7 of the control valve 1 is shown in a first embodiment, which comprises a pressure reduction level 28 subordinate to the valve seat 6, in the form of a rapid expansion stretching in the direction of flow of the medium. In the process, the direct transition from the valve seat 6 into the outlet funnel 8 is shell-like and with a small radius.

Figure 8:
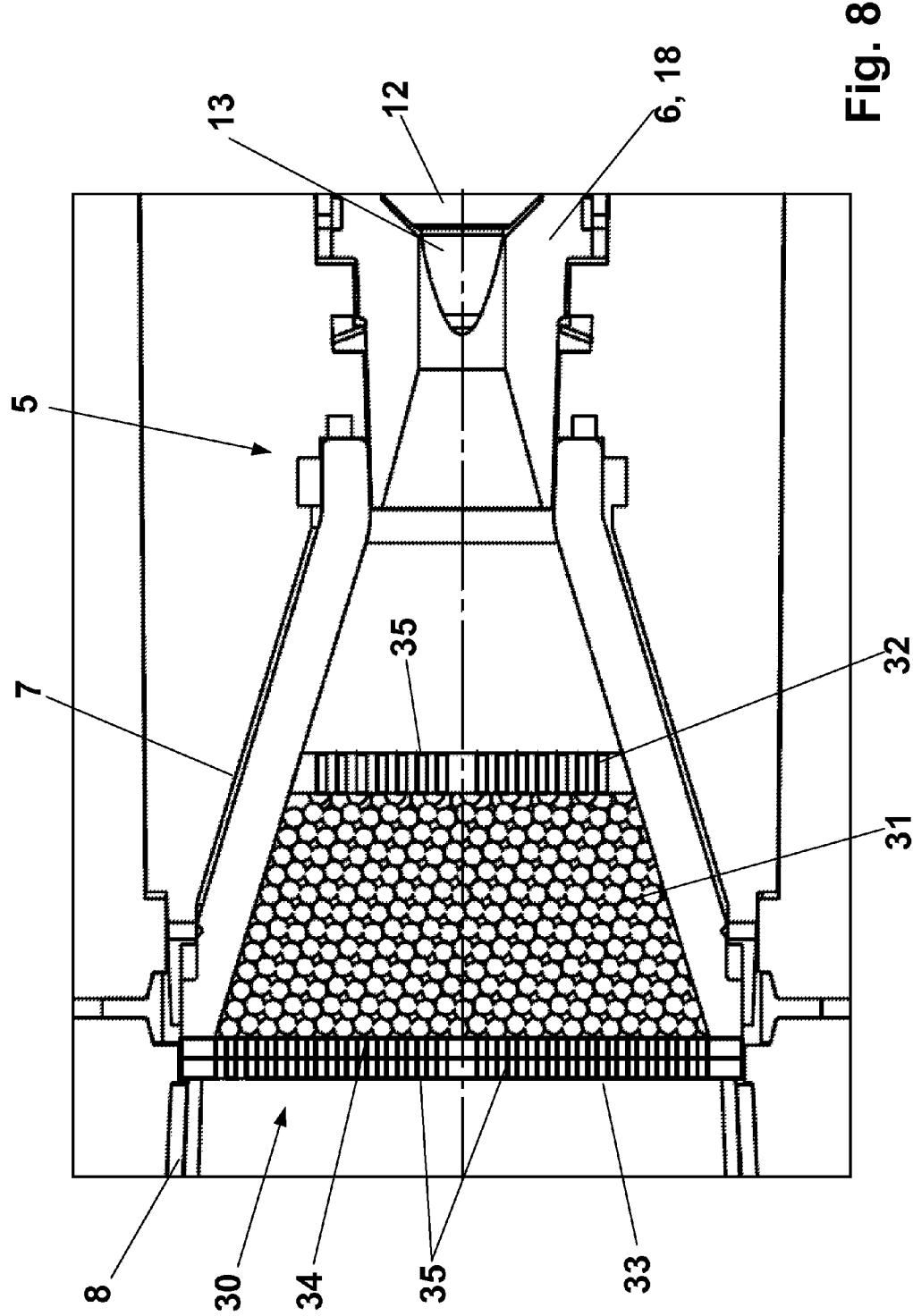
FIG. 8 shows an enlarged section as a side view of the external valve seat area of the angle control valve as a single valve in a second embodiment.

According to FIG. 8, a bed 30 of a variety of tungsten carbide balls 31 is introduced in the external valve seat 7. The bed 30 of tungsten carbide balls 31 is bordered by screening plates 32, 33, 34 on the inlet and outlet sides. The holes 35 of the screening plates 32 and 34 have a quadratic form, so that one side, the tungsten carbide balls 31 can lie on the holes 35, and the medium can still flow through the holes 35. The tungsten carbide balls 31 are larger than the holes 35 for this reason.

On the outlet side, two screening plates 33 and 34 are provided one behind the other. The first screening plate 34 consists of solid tungsten carbide, and the second screening plate 33 is made of heat-resistant steel. The holes 35 of the second screening plate 33 are arranged behind the holes 35 of the first screening plate 34, in order to guarantee a flow passage for the medium.

Figure 9:
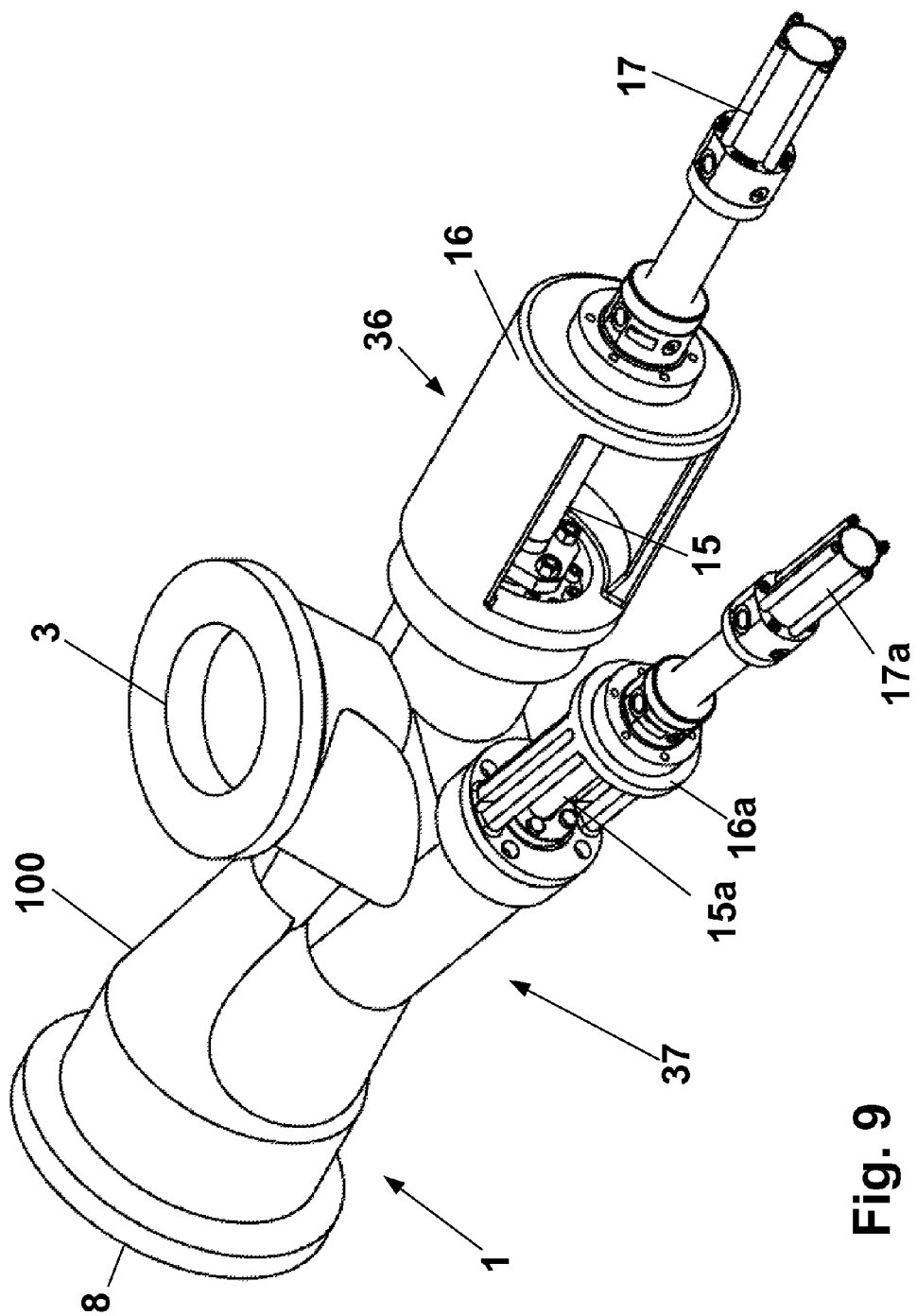
FIG. 9 is a perspective view of a double control valve.
Figure 10:
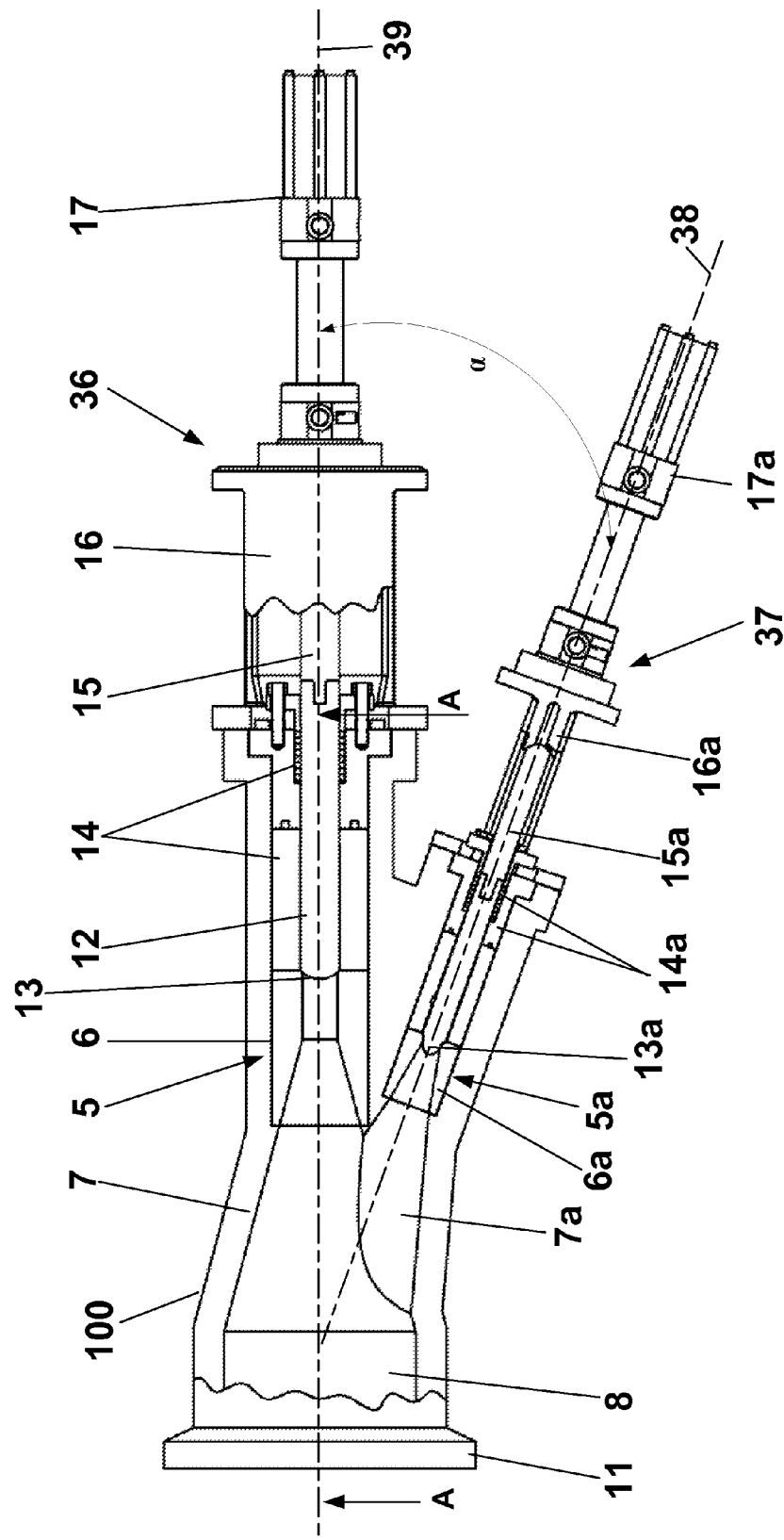
FIG. 10 is a side view in partial section A-A of the double control valve according to FIG. 9.
Figure 11:
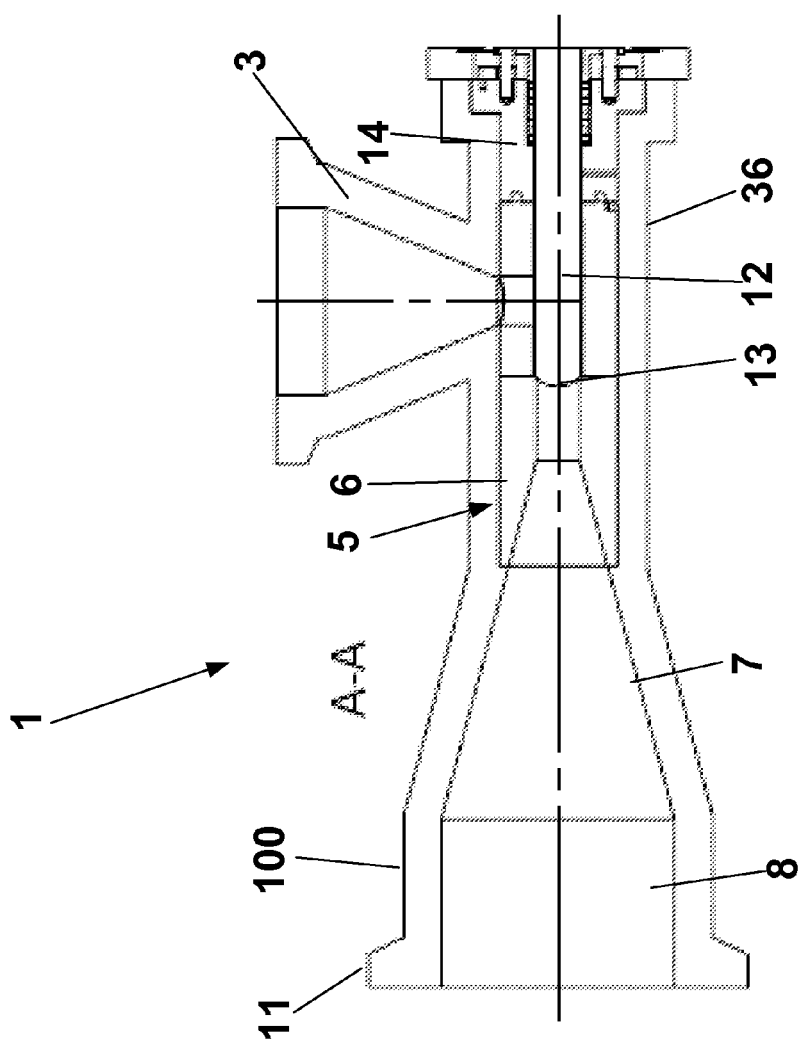
FIG. 11 is a partial side view of the double control valve according to FIG. 10.
Figure 12:
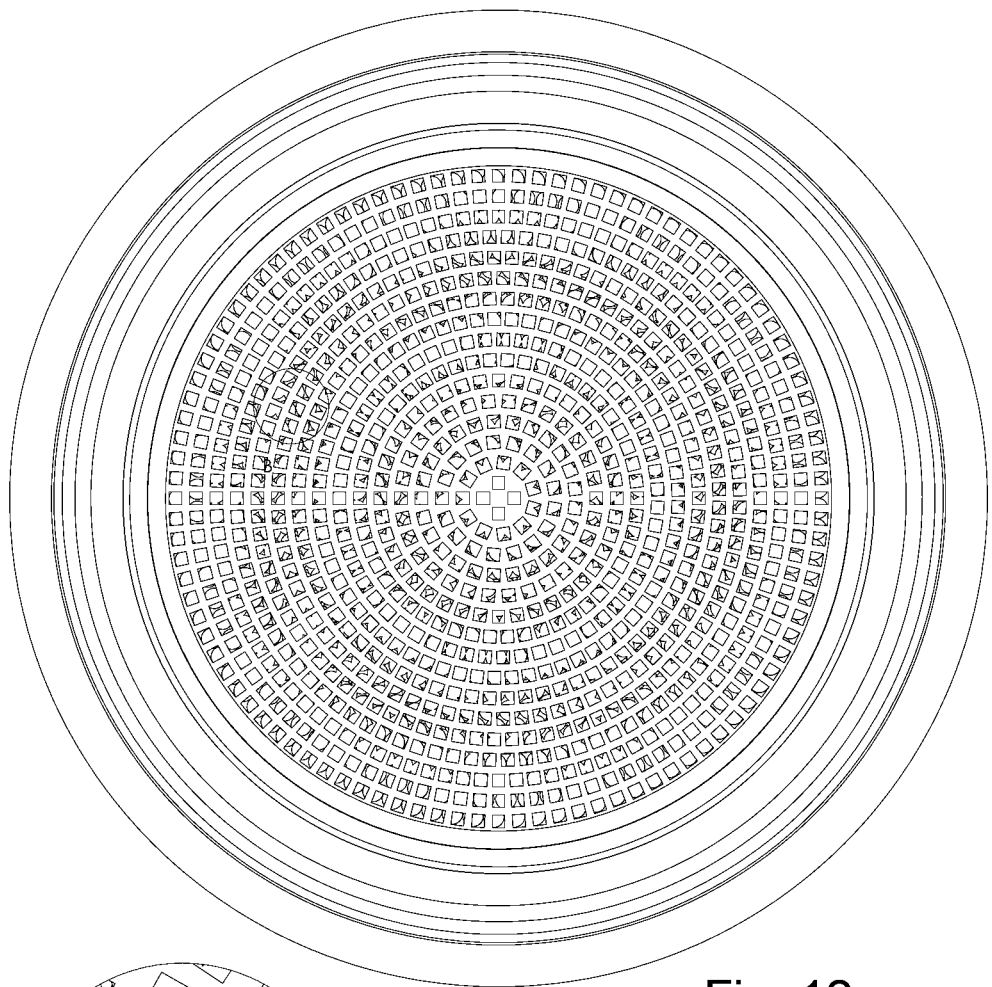
FIG. 12 is a view looking directly into the square holes from the left-hand side of FIG. 8.
Figure 13:
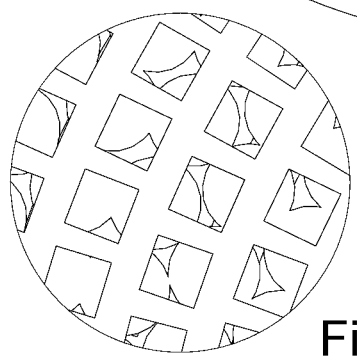
FIG. 13 is an enlarged view of the section circled on the upper left-hand side of claim 12.

The double control valve 1 shown in FIGS. 9 to 11 comprises a valve housing 100, and consists in its main parts of a large valve part 36 and a small valve part 37 in the same valve housing 100. Whilst the large valve part 36 is provided as an adjustable 'on/off' piston valve, the small valve part 37 serves as a control valve.

The reference numerals for the components of the previously described single valve correspond to those of the large valve part 36 and those of the small valve part 37, whereby an 'a' is added to the reference numerals of the small valve 37, provided that they are the same. The double valve components which are the same as the single valve components will not be described again, but rather reference will be made to the embodiments of the previously described single control valve.

A common inlet funnel 3 for both valve parts 36 and 37 is arranged on the valve housing 100.

The longitudinal axis 38 of the small valve part 37 is inclined to the longitudinal axis 39 of the large valve part 36 at an angle α of preferably approximately 20°.

LIST OF REFERENCE NUMERALS

| | |
|---|---|
| 1 | Control valve |
| 100 | Valve housing |
| 2 | Media supply |
| 3 | Inlet funnel |
| 4 | Clamp |
| 5 | Valve seat support |

-continued

| | |
|---|---|
| 6 | Internal valve seat |
| 7 | External valve seat |
| 8 | Outlet funnel |
| 9 | Clamp |
| 10 | Clamp |
| 11 | Connection flange |
| 12 | Valve piston |
| 13 | Valve head |
| 14 | Package holder, socket |
| 15 | Connection piece, stem |
| 16 | Connecting part/lantern |
| 17 | Hydraulic drive |
| 18 | Insert member |
| 19 | Wall |
| 20 | Flow contour |
| 21 | Slit |
| 22 | Pressure reduction level |
| 23 | Expansion |
| 24 | Constriction |
| 25 | Expansion |
| 26 | Covering |
| 27 | Disc spring |
| 28 | Pressure reduction level |
| 29 | Expansion |
| 30 | Bed |
| 31 | Tungsten carbide balls |
| 32 | Screening plate |
| 33 | Screening plate |
| 34 | Screening plate |
| 35 | Holes |
| 36 | Large valve part |
| 37 | Small valve part |
| 38 | Longitudinal axis |
| 39 | Longitudinal axis |
| α | Angle |

The invention claimed is:

1. Control valve (1), in particular angle control valve and double control valve, also as a seat valve and angle seat valve, for extreme control applications with erosive and corrosive media at temperatures of over 500° C. and pressure drops of over 100 bar, preferably for draining or down-regulating for high-pressure hot separators, medium-pressure hot separators and vacuum distillation columns, in particular for hydrogenation, and particularly for coal liquefaction, essentially with a valve housing, an inlet funnel (3), an outlet funnel (8) lined with tungsten-carbide, valve seats (6, 7) arranged between them, and a valve piston (12) provided with a control valve head (13), whereby the valve seats (6, 7) and the valve head (13) consist of solid tungsten carbide, characterised in that
  the valve piston (12) and the valve head (13) are integrally formed and consist of tungsten carbide,
  the valve head (13) has a shortened, approximately semicircular ball control contour, or the valve head (13) has a cup shape with one or several slits (21), whereby a hollow inner part is directed downstream,
  centred in the transition from the inlet funnel (3) to the valve seat (6), a wall (19) around the valve piston (12) protectively projects into the housing cavity, and the flow passage is formed around the wall (19) and the valve piston (12) by an approximately semicircular flow contour (20), or
  the valve housing, the valve seat (6) and a package holder (14) are designed so that an interior cavity continually narrows from the valve inlet to the valve seat (6), which prevents evaporation upstream of the valve seat (6), or one or several pressure reduction levels (22, 28) are formed in the valve seat (6, 74) and/or in the outlet funnel (8), or the lining (26) in the outlet funnel (8) and/or the valve seat (6, 7) is braced against the funnel wall or the valve seat support (5) by means of at least one innovative disc spring (27), and/or is protected from vibrations by means of a leather wrapping, or
  at the end of the valve seat (7) and/or in the outlet funnel (8) a bed (30) of tungsten carbide balls (31) is designed as an alternative pressure reduction level,
  wherein the hollow inner part of the cup-shaped valve head (13) is designed conically with the same angle as the expansion of the valve seat (6).

2. Control valve according to claim 1, characterised in that the slits (21) are distributed in the exterior wall of the cup-shaped valve head (13) in the direction of movement of the valve piston (12).

3. Control valve according to claim 1, characterised in that the several pressure reduction levels (22, 28) are arranged alternately expanding and constricting one after the other in the direction of flow of the medium in the valve seat (6, 7), and/or in the outlet funnel (8).

4. Control valve according to claim 1, characterised in that one pressure reduction level (28), subordinate to the valve seat (6, 7), has a rapid expansion (29) in the outlet funnel (8) in the direction of flow of the medium.

5. Control valve according to claim 1, characterised in that the disc spring (27) is designed as a slightly inclined radial spring and consists of Inconel.

6. Control valve according to claim 1, characterised in that the bed (30) of tungsten carbide balls (31) is bordered on the inlet and outlet side by screening plates (32, 33, 34), whereby the holes (35) of the screening plates (32, 34) preferably have a quadratic form.

7. Control valve according to claim 6, characterised in that on the outlet side, at least two screening plates (33, 34) are arranged one behind the other, whereby the first screening plate (34) consists of solid tungsten carbide, and the second screening plate (33) consists of heat-resistant steel, and the holes (35) of the second screening plate (34) are arranged directly behind the holes (35) of the first screening plate (33), or the holes (35) of the first screening plate (34) are formed slightly smaller than the holes (35) of the second screening plate (33), whereby the holes (35) of the second screening plate (33) widen conically.

8. Control valve according to claim 1, characterised in that the valve parts, in particular internal parts, instead of consisting of tungsten carbide, consist of ceramic e.g. SiN or SiC, or a mixture of tungsten carbide and ceramic.

9. Control valve according to claim 1, characterised in that the short package holder (14) or a similar damping device is provided between the tungsten carbide or ceramic parts and the steel body and the valve seat support parts.

10. Control valve according to claim 1, characterised in that internal parts can be removed without dismantling the connection part or a lantern (16) and a hydraulic drive (17).

11. Control valve according to claim 10, characterised in that the connection part or the lantern (16) is lengthened and expanded for repair and maintenance purposes.

12. Control valve according to claim 11, characterised in that the hydraulic drive (17) can be used to draw the internal parts out of the valve housing (100).

13. Control valve according to claim 1, characterised in that the tungsten carbide contains at least 10% binding agent, namely cobalt or nickel, and has an average particle size.

14. Control valve according to claim 1, characterised in that the double control valve consists of a large valve part (36) and a small valve part (37), whereby the large valve part (36) is formed as an adjustable 'on-off' piston valve, and the small valve part (37) is formed as a control valve.

15. Control valve according to claim 14, characterised in that the longitudinal axis of the small valve part (37) is inclined to the longitudinal axis of the large valve part (36) at an angle ($\alpha$) of about 20°.

16. Control valve according to claim 14, characterised in that the small valve part (37) is designed as a pulsing and/or 'on/off' control valve.

17. Control valve according to claim 14, characterised in that the inlet funnel (3) is split into two parts, in a way that there are no cross-sectional enlargements in front of the valve seats (6, 6*a*).

18. Control valve according to claim 14, characterised in that the large valve part (36) is designed in such a way that it takes at least 80% of the maximal flow without regulation, but which is adjustable by about 20%.

19. Control valve according to claim 14, characterised in that the small valve part (37) is designed in such a way that this takes up to about 20% of the maximal flow with regulation.

20. Control valve according to claim 1, characterised in that the valve seat support (5) and the package holder (14) are formed tapering slightly conically in the direction of flow, which are pressed against the valve housing (100), which also tapers slightly conically.

* * * * *